(12) United States Patent
Farhat et al.

(10) Patent No.: US 12,206,141 B2
(45) Date of Patent: Jan. 21, 2025

(54) THERMAL MANAGEMENT SYSTEM FOR FUEL CELL VEHICLE HAVING MULTIPLE FUEL-CELL STACKS

(71) Applicant: FORD GLOBAL TECHNOLOGIES, LLC, Dearborn, MI (US)

(72) Inventors: Hassan Farhat, Dearborn, MI (US); Ravi Gopal, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/508,338

(22) Filed: Nov. 14, 2023

(65) Prior Publication Data

US 2024/0079618 A1 Mar. 7, 2024

Related U.S. Application Data (62) Division of application No. 17/500,411, filed on Oct. 13, 2021, now Pat. No. 11,843,144, which is a division of application No. 16/660,164, filed on Oct. 22, 2019, now Pat. No. 11,201,341.

(51) Int. Cl.

| | | |
|---|---|---|
| *H01M 8/04* | (2016.01) | |
| *G05B 13/02* | (2006.01) | |
| *G05B 19/02* | (2006.01) | |
| *H01M 8/04007* | (2016.01) | |
| *H01M 8/04746* | (2016.01) | |
| *H01M 8/0662* | (2016.01) | |

(52) U.S. Cl.
CPC ........ *H01M 8/04768* (2013.01); *G05B 13/02* (2013.01); *G05B 19/02* (2013.01); *H01M 8/04007* (2013.01); *H01M 8/0662* (2013.01)

(58) Field of Classification Search
CPC ......... H01M 8/04768; H01M 8/04746; H01M 8/04783; H01M 8/04723; H01M 8/04731; H01M 8/04701; H01M 8/0662; H01M 8/04007; H01M 8/04029; G05B 13/02; G05B 19/02
See application file for complete search history.

(56) References Cited

U.S. PATENT DOCUMENTS

| | | |
|---|---|---|
| 6,068,941 A | 5/2000 | Fuller et al. |
| 7,730,734 B2 | 6/2010 | Hoshi et al. |
| 8,822,093 B2 | 9/2014 | Kim et al. |
| 9,520,604 B2 | 12/2016 | Leary et al. |
| 2001/0018832 A1* | 9/2001 | Matsunaga ............ B60H 1/034 62/239 |

(Continued)

*Primary Examiner* — Raymond Alejandro
(74) *Attorney, Agent, or Firm* — David B Kelley; Brooks Kushman P.C.

(57) ABSTRACT

A vehicle includes first and second fuel-cell stacks, a first coolant circuit including conduit arranged to circulate coolant through the first fuel-cell stack, and a second coolant circuit including conduit arranged to circulate coolant through the second fuel-cell stack. A heater is in fluid communication with at least the first coolant circuit. A valve arrangement is configured to proportion a flow of coolant between the first and second coolant circuits. The valve arrangement has an isolation position in which the first and second circuits are not in fluid communication and at least one mixing position in which the first and second circuits are in fluid communication. A controller is programmed to operate the value based on sensed conditions.

8 Claims, 9 Drawing Sheets

(56) References Cited

U.S. PATENT DOCUMENTS

| | | |
|---|---|---|
| 2005/0017587 A1 | 1/2005 | Koenig |
| 2009/0266508 A1 | 10/2009 | Furuta |
| 2010/0273079 A1 | 10/2010 | Hinsenkamp et al. |
| 2011/0159393 A1 | 6/2011 | Takemoto et al. |
| 2012/0000220 A1 | 1/2012 | Altay |
| 2013/0125566 A1 | 5/2013 | Grefe |
| 2015/0275924 A1* | 10/2015 | De Man .................... F04F 1/04 417/209 |
| 2017/0062846 A1 | 3/2017 | Kim et al. |
| 2017/0253105 A1 | 9/2017 | Allgaeuer et al. |
| 2017/0263954 A1 | 9/2017 | Shaikh et al. |
| 2020/0052313 A1* | 2/2020 | Kajiwara ................. B60L 3/12 |

\* cited by examiner

THERMAL MANAGEMENT SYSTEM FOR FUEL CELL VEHICLE HAVING MULTIPLE FUEL-CELL STACKS

CROSS-REFERENCE TO RELATED APPLICATIONS

This application is a division of U.S. application Ser. No. 17/500,411, filed Oct. 13, 2021, now U.S. Pat. No. 11,843,144, issued Dec. 12, 2023, which is a division of U.S. application Ser. No. 16/660,164 filed Oct. 22, 2019, now U.S. Pat. No. 11,201,341, issued Dec. 14, 2021, the disclosures of which are hereby incorporated in their entirety by reference herein.

TECHNICAL FIELD

This disclosure relates to vehicle having multiple fuel-cell stacks and more specifically to thermal management systems for thermally regulating the fuel-cell stacks.

BACKGROUND

The hydrogen fuel cell, and in particular the proton exchange membrane fuel cell (PEMFC), is one potential power source for automobiles and stationary applications. The reaction in a PEMFC involves hydrogen molecules splitting into hydrogen ions and electrons at the anode, while protons re-combine with oxygen and electrons to form water and release heat at the cathode. Typically, a proton exchange membrane is used as a proton conductor in a PEMFC. A catalyst layer containing, for example, platinum and/or a platinum alloy is used to catalyze the electrode reactions. A gas diffusion layer, which may include a microporous layer and a gas diffusion backing layer, is used to transport reactant gases and electrons as well as remove product water and heat.

Excessively cold or hot fuel cell temperatures may affect the membrane and other materials in the stack. Fuel cell systems typically include thermal management systems to control the temperature of the fuel-cell stack within a desired temperature range.

SUMMARY

According to one embodiment, a vehicle includes first and second fuel-cell stacks, a first coolant circuit having conduit arranged to circulate coolant through the first fuel-cell stack, a second coolant circuit having conduit arranged to circulate coolant through the second fuel-cell stack, a heater in fluid communication with at least the first coolant circuit, and an isolation valve assembly configured to proportion a flow of coolant between the first and second coolant circuits. The isolation valve assembly includes a first inlet port connected to the conduit of the first circuit, a first outlet port connected to the conduit of the first circuit, a second inlet port connected to the conduit of the second circuit, a second outlet port connected to the conduit of the second circuit, and valving. The valving has an isolation position in which the first inlet port and the second outlet port are not in fluid communication and the second inlet port and the first outlet port are not in fluid communication so that the first and second circuits are isolated. The valving also has at least one mixing position in which the first inlet port and the second outlet port are in fluid communication and the second inlet port and the first outlet port are in fluid communication so that the first and second circuits are in fluid communication.

According to another embodiment, a vehicle includes first and second fuel-cell stacks and a thermal management system. The thermal management system includes a first coolant circuit including conduit arranged to circulate coolant through the first fuel-cell stack, a first pump, and a first radiator; a second coolant circuit including conduit arranged to circulate coolant through the second fuel-cell stack, a second pump, and a second radiator; and a third coolant circuit including conduit arranged to circulate coolant through a heater, a third pump, and a heater core. A first valve arrangement is configured to selectively connect the third circuit to the first circuit and configured to selectively connect the third circuit to the second circuit. A second valve arrangement is configured to proportion a flow of coolant between the first and second coolant circuits.

According to yet another embodiment, a vehicle includes first and second fuel-cell stacks, a first coolant circuit having conduit arranged to circulate coolant through the first fuel-cell stack, a second coolant circuit having conduit arranged to circulate coolant through the second fuel-cell stack, and a heater in fluid communication with at least the first coolant circuit. A valve arrangement is configured to proportion a flow of coolant between the first and second coolant circuits. The valve arrangement includes an isolation position in which the first and second circuits are not in fluid communication and at least one mixing position in which the first and second circuits are in fluid communication. a controller is programmed to, in response to coolant of the first circuit being less than a first threshold, command the isolation valve assembly to the isolation position and command the heater ON, and, in response to coolant of the first circuit exceeding a second threshold, command the isolation valve assembly to the at least one mixing position and command the heater OFF.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A PEMFC includes a proton exchange membrane (PEM). The anode and the cathode typically include finely divided catalytic particles, usually platinum, supported on carbon particles and mixed with an ionomer. The catalytic mixture is deposited on opposing sides of the membrane. The combination of the anode-catalytic mixture, the cathode-catalytic mixture, and the PEM form a coated catalyst membrane electrode (CCM). In order to facilitate the transport of reactant gases to and remove the excessive water and heat from the catalytic mixture, a gas diffusion layer (GDL), which may include a microporous layer and a carbon-fiber-based gas diffusion backing layer, may be applied on either side of the CCM to form a membrane electrode assembly (MEA). GDLs also provide mechanical support for the soft goods including the PEM and catalytic mixtures.

MEAs are sandwiched between bipolar plates to form unit cells. The bipolar plates typically include an anode side and a cathode side. Anode fuel flow channels are provided on the anode side of the bipolar plates that allow the anode gas to flow to the anode side of the MEA. Cathode oxidant flow channels are provided on the cathode side of the bipolar plates that allow the cathode gas to flow to the cathode side of the MEA. Coolant channels may be disposed between the anode and cathode sides of the bipolar plates to thermally regulate the fuel cell.

Several unit cells are typically combined in a fuel-cell stack to generate the desired power. For example, the stack may include two-hundred or more unit cells arranged in series. The fuel-cell stack receives a cathode reacting gas, typically a flow of air forced through the stack by a compressor. Not all the oxygen is consumed by the stack and some of the air is output as a cathode exhaust gas that may include water as a stack byproduct. The fuel-cell stack also receives an anode hydrogen reacting gas that flows into the anode side of the stack.

Figure 1:
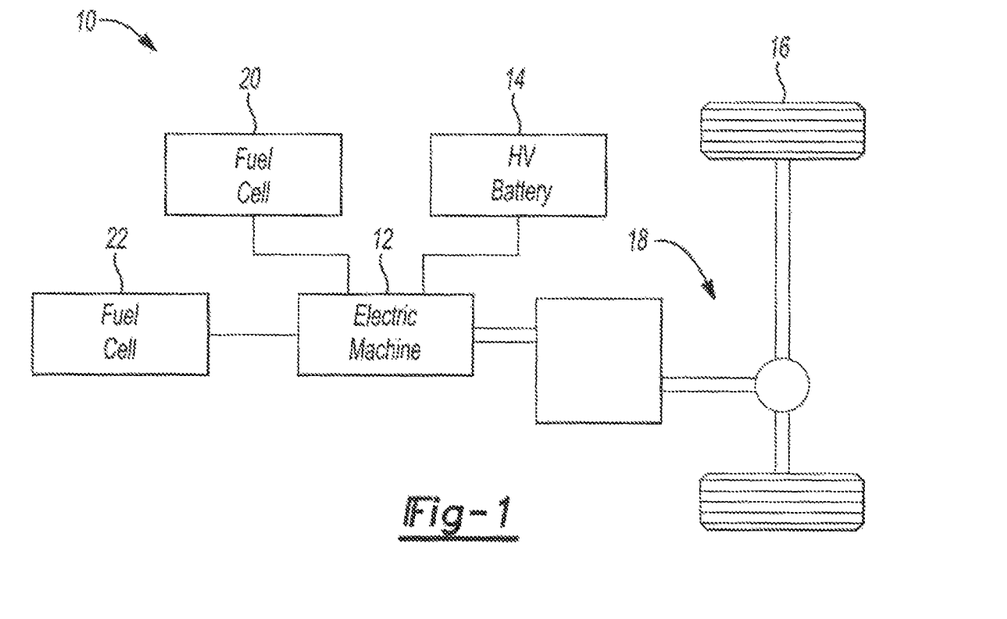
FIG. 1 is a schematic of a fuel-cell vehicle.

Referring to FIG. 1, a vehicle 10 includes a first fuel-cell stack 20 and a second fuel-cell stack 22 for providing electrical power to at least one electric machine 12. The vehicle 10 may also include a traction battery 14 electrically connected to the fuel cells 20, 22 and the electric machine 12. The electric machine 12 is connected to the driven wheels 16 via a drivetrain 18. During operation of the vehicle 10, hydrogen fuel and air are fed into the fuel cell 20 creating electrical power. The electric machine 12 receives the electrical power as an input, and outputs torque for driving the wheels 16 to propel the vehicle 10.

The fuel-cell stacks 20, 22 generate heat during operation and include an associated thermal management system for thermally regulating the temperature of the stacks. In addition to cooling the stacks 20, 22, the thermal management system is also configured to heat the stacks. It is difficult to start a fuel cell in very cold ambient conditions such as below −25 degrees Celsius (C) for example. (Starting a fuel cell when the temperate is below a threshold may be referred to as cold start.) To improve cold start, the fuel-cell stacks 20, 22 may be preheated (also known as preconditioning) by circulating heated coolant through one or more of the stacks 20, 22. Once the stack reaches a threshold temperature, such as −25 degrees, the fuel cell is started. This of course is just an example temperature and the threshold temperature will vary based on fuel cell design and other factors. The preheating can ended once the fuel cell is started as heat from the chemical reactions will self-heat the fuel-cell stack to a desired operational temperature, at which point active cooling may be required. The preheating may be performed by an electric heater such as a positive temperature coefficient (PTC) heater that converts electricity, typically provided by the battery 14, into heat.

Figure 2:
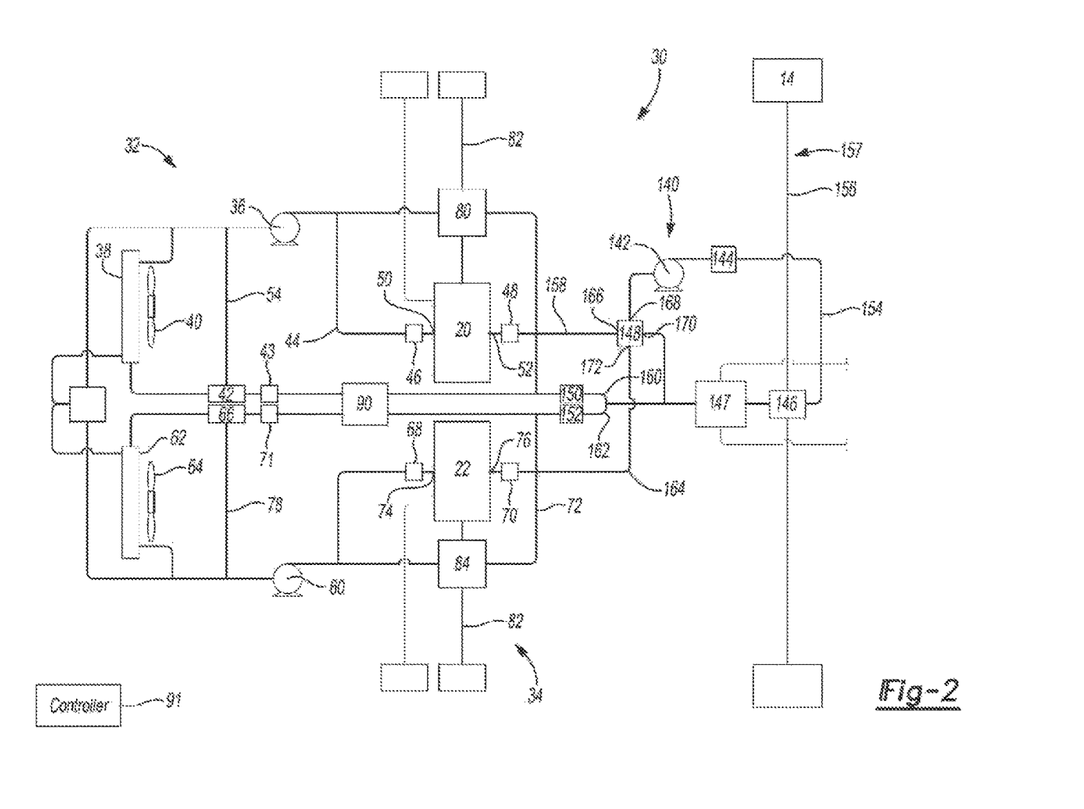
FIG. 2 is a schematic diagram of a thermal management system.

The following figures and related text describe an example thermal management system of the vehicle 10. Referring to FIG. 2, a thermal management system 30 thermally regulates at least the first and second fuel-cell stacks 20, 22 and may also be responsible for thermally regulating traction battery 14 and supplying heat to the passenger cabin. The thermal management system 30 uses liquid coolant, such as ethylene glycol mixed with deionized water, as the working fluid. The thermal management system 30 may include a first coolant circuit 32 associated with the first stack 20 and a second coolant circuit 34 associated with the second stack 22.

The first circuit 32 may include a pump 36, a radiator 38 with an associated fan 40, a valve 42 (e.g., an electric three-way valve or wax thermostat), temperature sensors 46, 48, and conduit 44 that is a collection of multiple lines, hoses, pipes, tubes, etc., arranged to form a closed loop. In the illustrated embodiment, the valve 42 is an electric three-way valve and a temperature sensor 43 is provided to determine actuation of the valve 42. While not shown, the first circuit 32 may include a pressure sensor and other flow control devices such as check valves. The conduit 44 carries the coolant through the associated components of the first coolant circuit 32. The term "conduit" may refer to the collection of all conduit of the circuit 32 or a specific segment(s) of the conduit depending upon context. The first circuit 32 is configured to heat or cool the stack 20 depending upon the relative temperatures of the coolant and the fuel-cell stack 20. When the system is active, the pump 36 circulates coolant into an inlet 50 of the stack 20, the coolant then travels through the internal cooling system of the stack 20 exchanging thermal energy, and exits via an outlet 52. From there, the conduit 44 conveys the coolant to the valve 42. The valve 42 operates to either route the coolant to the radiator 38 if the coolant is too hot or bypasses the radiator via the bypass line 54. The valve 42 may be configured to proportion coolant between the radiator 38 and the bypass line 54. The fan 40 is arranged to increase air flow through the radiator 38 if needed. The fan 40 may be electronically controlled. The temperature sensor 46 may be located just upstream of the fuel-cell stack 20 to measure the temperature of the coolant at the inlet 50. The temperature sensor 48 may be located just downstream of the fuel cell 20 to measure temperature of the coolant at the outlet 52.

The second circuit 34 may include a pump 60, a radiator 62 with an associated fan 64, a valve 66 (e.g., an electric three-way valve or a wax thermostat), temperature sensors 68, 70, 71, and conduit 72 that is a collection of multiple lines, hoses, pipes, tubes, etc., arranged to form a closed loop. The conduit carries the coolant through the associated components of the first coolant circuit 34. The second circuit 34 is configured to heat or cool the stack 22 depending upon the relative temperatures of the coolant in the fuel-cell stack. When the system is active, the pump 60 circulates coolant into an inlet 74 of the stack 22, the coolant then travels through the internal cooling system of the fuel cell exchanging thermal energy, and exits via an outlet 76. From there, the conduit 72 conveys the coolant to the valve 66. The valve 66 operates to either route the coolant to the radiator 62 if the coolant is too hot or bypasses the radiator via the bypass line 78. The valve 66 may be configured to proportion coolant between the radiator 62 and the bypass line 78. The fan 64 is arranged to increase air flow through the radiator 62 if needed. The fan 64 may be electronically controlled. The temperature sensor 68 may be located just upstream of the fuel-cell stack 22 to measure the temperature of the coolant at the inlet 74. The temperature sensor 70 may be located just downstream of the fuel cell 22 to measure temperature of the coolant at the outlet 76.

The first and second coolant circuits 32 and 34 may also be used to cool or heat the compressed air supplied to the fuel cells 20, 22. An intercooler 80 is connected to the conduit 44 and a compressed-air line 82. The intercooler 80 is configured to exchange heat between the compressed air and the coolant. An intercooler 84 is connected to the conduit 72 and a compressed air line 86. The intercooler 84 is configured to exchange heat between the compressed air and the coolant.

A valve arrangement 90 selectively connects the first circuit 32 and the second circuit 34 in fluid communication. A valve arrangement is a collection of one or more valves configured to modify fluid flow between one or more inlet ports and one or more outlet ports. A valve arrangement may include multiple valves housed in a common body or multiple discrete valves acting in unison with each other. The valve arrangement may be passive or electrically controlled. Example valve arrangements include two-way valves, three-way valves, four-way valves, check valves, an isolation valve, and the like. When the valve arrangement 90 is closed, the first and second circuits 32, 34 are separate and the coolant in those circuits does not mix. When the valve arrangement 90 is open, the first and second circuits 32, 34 are in fluid communication with each other and the coolant mixes. The valving arrangement 90 may be electronically controlled by controller (such as controller 91) to connect the first and second circuits 32, 34 in fluid communication and to isolate the first and second circuits 32, 34. Used herein "isolate" means to sever or prevent fluid communication. The controller 91 may be programmed to actuate the valve arrangement 90 between the closed position and a plurality of different open positions (sometimes called mixing positions) that proportion the amount of coolant mixing between first and second circuits.

Figure 3:
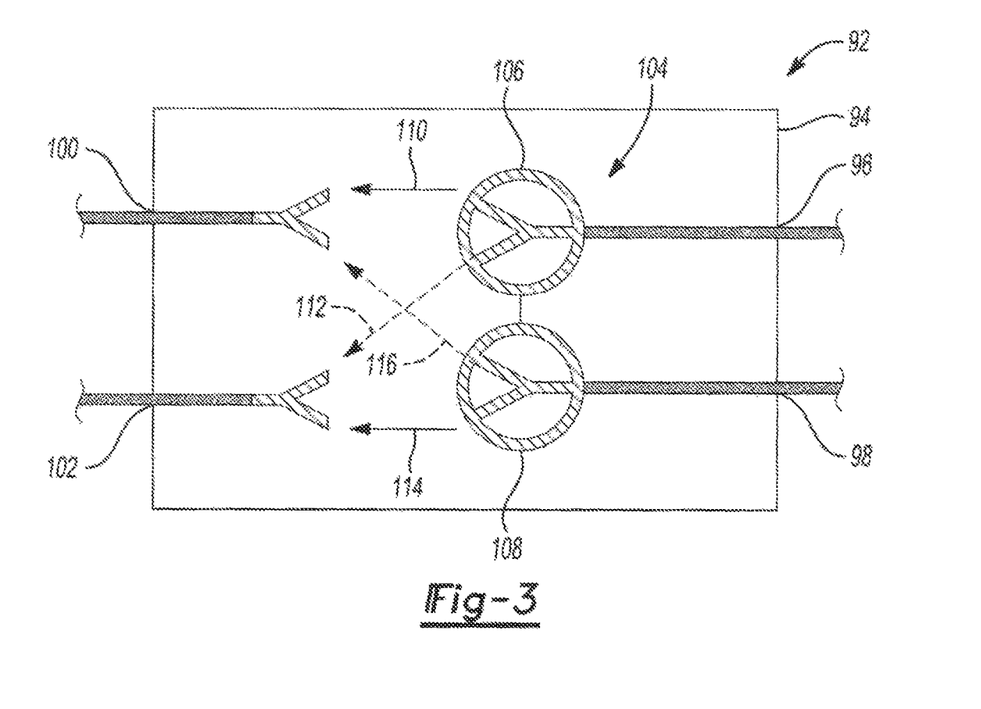
FIG. 3 is a schematic diagram of a valve arrangement according to one embodiment.

Referring to FIG. 3, according to one or more embodiments, the valve arrangement 90 is an isolation valve assembly 92 having a housing 94 with ports and valving. For example, the housing 94 may include a first inlet port 96, a second inlet port 98, a first outlet port 100, and a second outlet port 102. The first inlet port 96 and the first outlet port 100 are connected to the conduit 44 of the first circuit 32, and the second inlet port 98 and the second outlet port 102 are connected to the conduit 72 of the second circuit 34. Valving 104 is disposed in the housing 94 and controls the flow of fluid between the inlet and outlet ports.

In the illustrated embodiment, the valving 104 includes a first valve 106 and a second valve 108. The first valve 106 is associated with the first inlet port 96 and controls the flow of fluid from the inlet port 96 between the first and second outlet ports 100 and 102. A first fluid path 110 connects between the inlet port 96 and the outlet port 100 and the second fluid path 112 connects between the inlet port 96 and the outlet port 102. The valve 106 is configured to proportion coolant between the paths 110 and 112 depending upon the position of the valve 106. The valve 106 includes a first position in which all of the fluid flows from the inlet port 96 to the outlet port 100, a second position in which all the fluid flows from the inlet port 96 to the outlet port 102, and intermediate positions in which coolant flows through both the first path 110 and the second path 112. The second valve 108 is associated with the second inlet port 98 and controls the flow of fluid from the inlet port 98 between the first and second outlet ports 100 and 102. A third fluid path 114 connects between the inlet port 98 and the outlet port 102 and a fourth fluid path 116 connects between the inlet port 98 and the outlet port 100. The valve 108 is configured to proportion coolant between the paths 114 and 116 depending upon the position of the valve. The valve 108 includes a first position in which all of the fluid flows from the inlet port 98 to the outlet port 102, a second position in which all the fluid flows from the inlet port 98 to the outlet port 100, and intermediate positions in which coolant flows through both the third path 114 and the fourth path 116.

When the isolation valve assembly 92 is in the closed position, the valves 106 and 108 are in their first positions so that fluid flows only through the first path 110 and the third path 114. When the isolation valve assembly 92 is in the fully open position, the valves 106 and 108 are in their second positions so that fluid flows only through the second path 112 and the fourth path 116. When the isolation valve assembly 92 is in one or more partially open positions, the valves 106 108 are in one of their intermediate positions so that the fluid flows through all four paths 110, 112, 114, and 116. The valves 106 and 108 may be synchronized so that movement of the valve 106 results in a proportional movement of the valve 108 and vice versa. For example, if the valve 106 is actuated so that 80 percent of the coolant is routed to the first outlet 100 and 20 percent of the coolant is routed to the outlet 102, the valve 108 is actuated so that 80 percent of the coolant is routed to the second outlet 102 and 20 percent of the coolant is routed to the first outlet 100.

Figure 4:
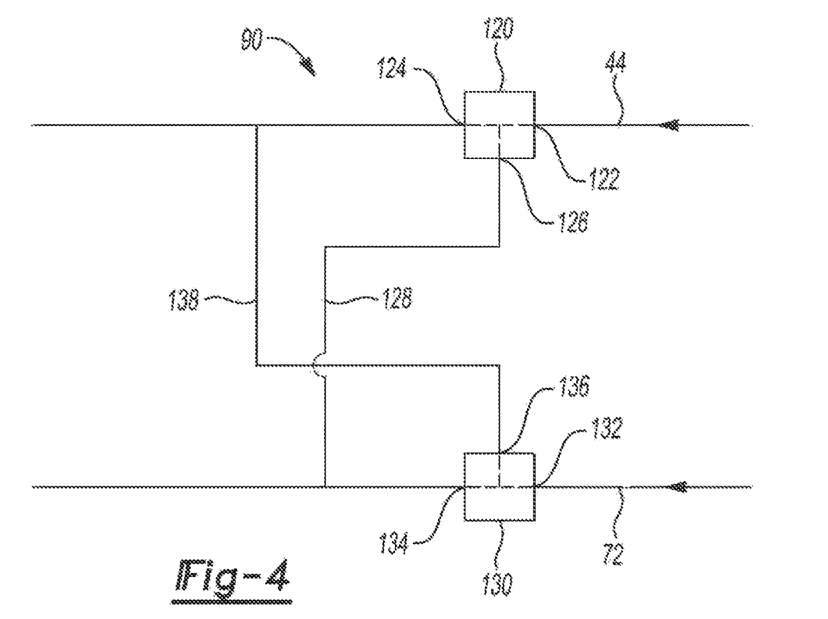
FIG. 4 is a schematic diagram of a valve arrangement according to another embodiment.

Referring to FIG. 4, according to an alternative embodiment, the valve arrangement 90 is collection of two three-way valves 120, 130 and associated conduit. The first three-way valve 120 includes an inlet port 122 connected to the conduit 44 an outlet port 124 connected to the conduit 44 and an outlet port 126 connected to the conduit 72 by a conduit 128 that connects downstream of the valve 130. The three-way valve 120 may be configured to route all the coolant to the outlet 124, all of the coolant the outlet 126, or proportion coolant between both outlets 124, 126. The second three-way valve 130 includes an inlet port 132 connected to the conduit 72 an outlet port 134 connected to the conduit 72 and an outlet port 136 connected to the conduit 44 by a conduit 138 that connects downstream of the valve 120. The three-way valve 130 may be configured to route all the coolant to the outlet 134, all of the coolant the outlet 136, or proportion coolant between both outlets 134, 136. FIGS. 3 and 4 are just two examples of the valve arrangement 90 and are not limiting.

Referring back to FIG. 2, the thermal management system 30 also includes a third coolant circuit 140 associated with the traction battery 14 and the heating ventilation and air-conditioning system (HVAC) system. The third circuit 140 may include a pump 142, a heater 144, heat exchanger 146, a heater core 147, a valve 148 (e.g., a four-way valve), an ON-OFF valve 150, an ON-OFF valve 152, and conduit 154 configured to circulate coolant between these various components. (The valves 150 and 152 may be referred to as a valve arrangement). The heater 144 may be an electric heater configured to convert electricity into thermal energy that heats the coolant. For example, the heater 144 may be a positive temperature coefficient (PTC) heater. The heater core 147 may be disposed within the HVAC unit and transfers heat from the coolant of the third circuit 140 to air bound for the passenger cabin. The heat exchanger 146 may be a liquid-to-liquid heat exchanger. The heat exchanger 146 is connected to the conduit 154 and to conduit 156 of the battery cooling circuit 157. The heat exchanger 146 is configured to transfer thermal energy between the conduit 154 and the conduit 156 without mixing the fluids.

Four conduits connect the third circuit 140 to the first and second circuits 32, 34. A conduit 158 connects the first circuit 32 to the third circuit 140 at the valve 148, and a conduit 164 connects the second circuit 34 to the third circuit 140 at the valve 148. Additional conduit 160 and 162 connect to the circuits together as well. The conduits may act as return conduit to the first and second circuits. The valves 148, 150, and 152 open and close in cooperation to fluidly connect the third circuit 140 to the first circuit 32 and/or the second circuit 34, and to isolate the third circuit. The circuit 140 can be isolated from circuits 32 and 34 via the four-way valve by blocking conduit 158 and conduit 164 and allowing flow through the port 170.

According to one embodiment, the valve 148 is a four-way valve that includes a first port 166 connect to the conduit 158, a second port 168 supplying coolant to the pump 142, third port 170, and fourth port 172. The ports 166, 170, and 172 may be inlet ports and the port 168 may be an outlet port. The inlet ports may be individually controlled between opened, closed, and/or throttled positions (in some embodiments, only ports 166 and 172 are proportional). The four-way valve 148 may be electronically controlled by the controller 91. The valves 150 and 152, which may also be controlled by the controller 91, regulate the flow of fluid through the conduits 160 and 162, respectively.

As discussed above, it is difficult to start a fuel cell when the temperature is below a certain threshold. The fuel cell may be warmed above a starting temperature (temperature sufficient for reliable starting) using a heater, e.g., heater 144, powered by the battery 14. Heating coolant using electricity is inefficient and it is advantageous to utilize the heater 144 as little as possible so that more of the stored energy in the battery 14 can be used for propulsion. According to one embodiment, the heater 144 is used to heat only one of the fuel-cell stacks 20, 22 in a preconditioning step. In this example, the stack 20 is heated. Once the fuel-cell stack 20 reaches the starting temperature, that fuel-cell stack 20 is started and the heater 144 is turned OFF (unless cabin or battery heating requires use of the heater 144). The fuel-cell stack 20 continues to run heating itself up. Once the coolant of the first circuit reaches a threshold temperature, waste heat from the fuel-cell stack 20 is used to precondition the second fuel-cell stack 22. The second fuel-cell stack 22 can be started once it reaches its starting temperature. This sequence of events will be described in more detail below.

Figure 5:
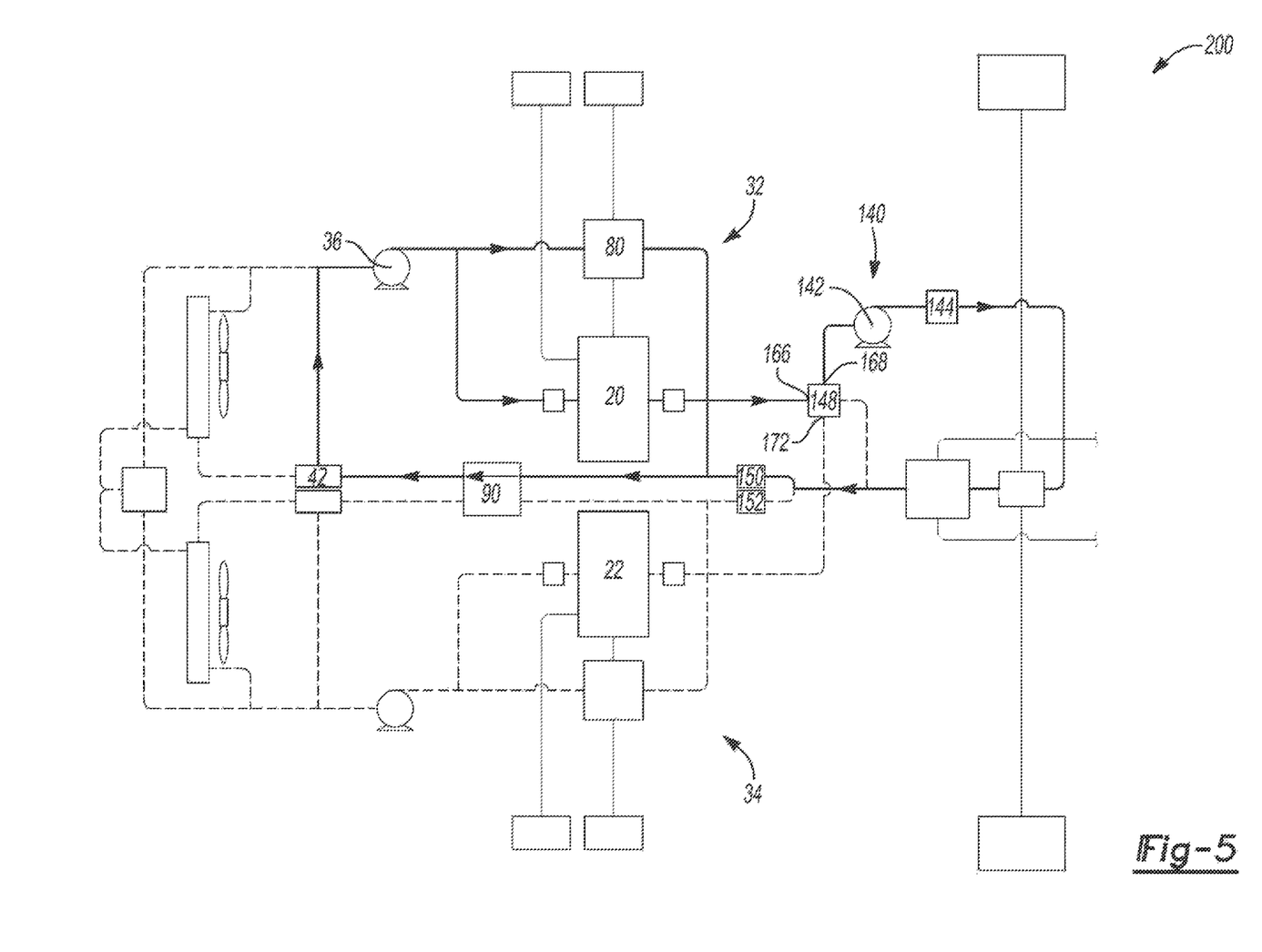
FIG. 5 is a schematic diagram of the thermal management system in a preconditioning mode for warming the first fuel-cell stack prior to starting.

The thermal management system 30 includes a plurality of different modes. Representative examples of these modes will be described in FIGS. 5 through 9 and the associated text. (Solid lines indicate active coolant flow, dashed lines indicate inactively). FIG. 5 illustrates a preconditioning mode for warming the first fuel-cell stack 20 prior to starting. The preconditioning mode 200 warms the fuel-cell stack 20 to a temperature sufficient for reliable starting. In this mode, only the first stack 20 is being heated by the heater 144. In the preconditioning mode 200, the first circuit 32 and the third circuit 140 are active and are connected in fluid communication with each other by actuating valves 148 and 150 accordingly. The second circuit 34 is deactivated and isolated from the other circuits by actuating valves 148 and 152 accordingly. The first and third circuits 32, 140 are connected in fluid communication by opening the valve 150 and actuating the valve 148 so that the inlet 166 is connected in fluid communication with the outlet 168 and the other and inlets of valve 148 are OFF. Closing the inlet 172 and actuating the valve 152 to the closed position isolates the second circuit 34 from the third circuit 140. The valve arrangement 90 is closed to isolate the first and second circuits 32, 34, e.g., the valve 106 is actuated so that all of the coolant flowing from the inlet 96 flows through path 110 to the outlet 100. In mode 200, the pumps 36, 142 are ON, the PCT heater 144 is ON, and the valve 42 is actuated to bypass the radiator 38.

Starting at the pump 142, coolant circulates through the heater 144 where the coolant is warmed and subsequently flows into the first circuit 32 through the open valve 150. The heated coolant then passes through the pump 36 and subsequently through the fuel-cell stack 20 and the intercooler 80. In some embodiment, the intercooler 80 may be bypassed to reduce heating time for the fuel cell. The heated coolant warms the stack 20 and the discharged coolant re-circulates to the pump 142 through the four-way valve 148. The HVAC system and the battery coolant loop may be deactivated so that all of the heat from the heater 144 is used to warm the fuel-cell stack 20.

The vehicle 10 may include a preconditioning mode for the second stack 22. This mode is a mirror of the mode 200 except that the second circuit 34 is active and connected to the third circuit 140 and the first circuit 32 is OFF.

Figure 6:
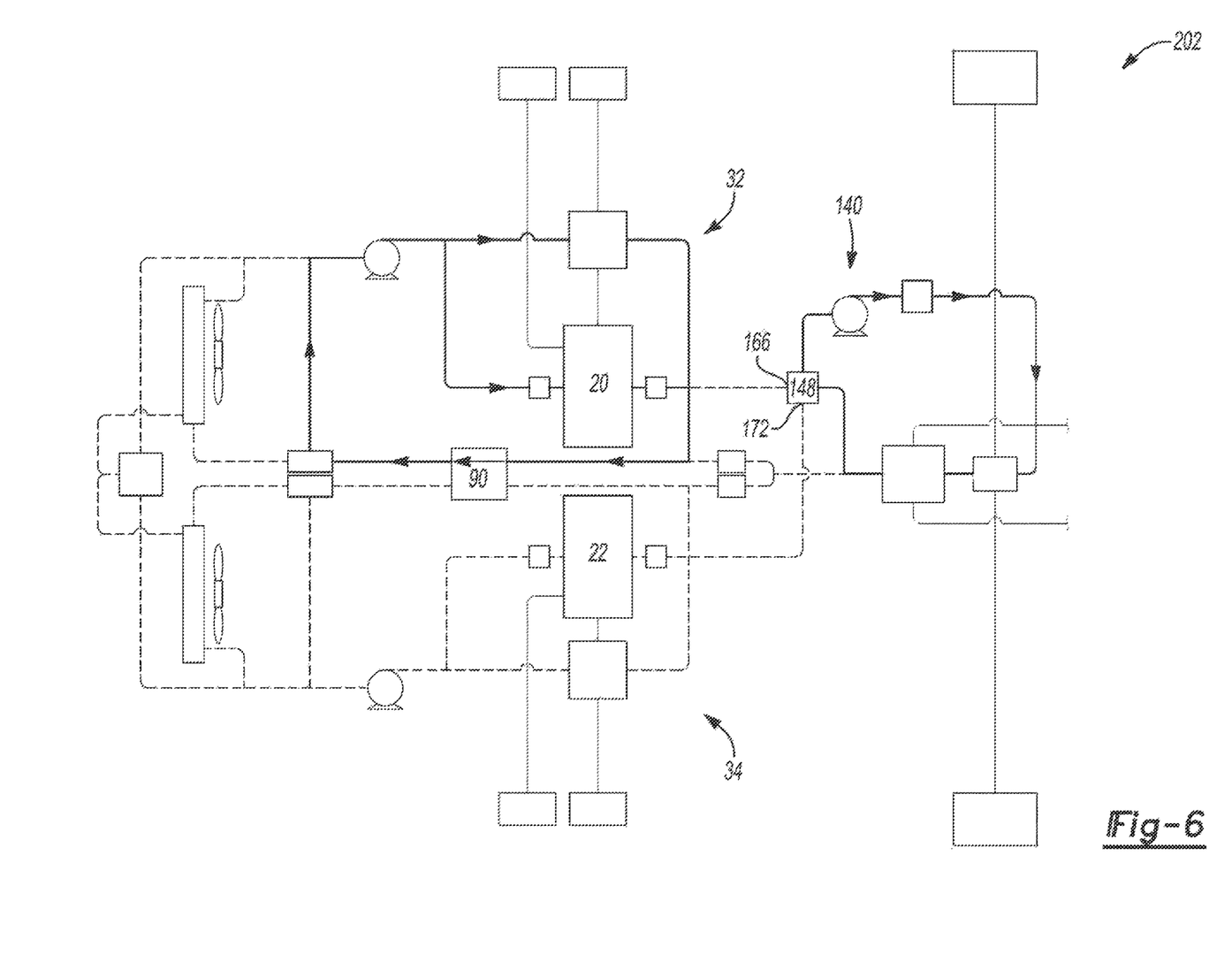
FIG. 6 is a schematic diagram of the thermal management system in a warm-up mode of the first fuel-cell stack.

FIG. 6 illustrates a mode 202, which may be referred to as warm-up mode, used post cold start of the fuel-cell stack 20. The mode 202 may be utilized following mode 200. In this mode, coolant in the first circuit 32 is isolated while the fuel cell 20 heats up using self-generated waste heat. The first circuit 32 remains isolated from the second circuit 34 and is now isolated from the third circuit 140 by actuating the four-way valve 148 to close the inlets 166 and 172. In mode 202, the third circuit 140 may be activated or deactivated depending upon the needs of the battery 14 and the cabin. In FIG. 6, the third circuit 140 is shown activated (pump and heater ON) to heat the battery 14 and the passenger cabin. A similar mode may be used for the second fuel-cell stack 22 if it is started first.

Figure 7:
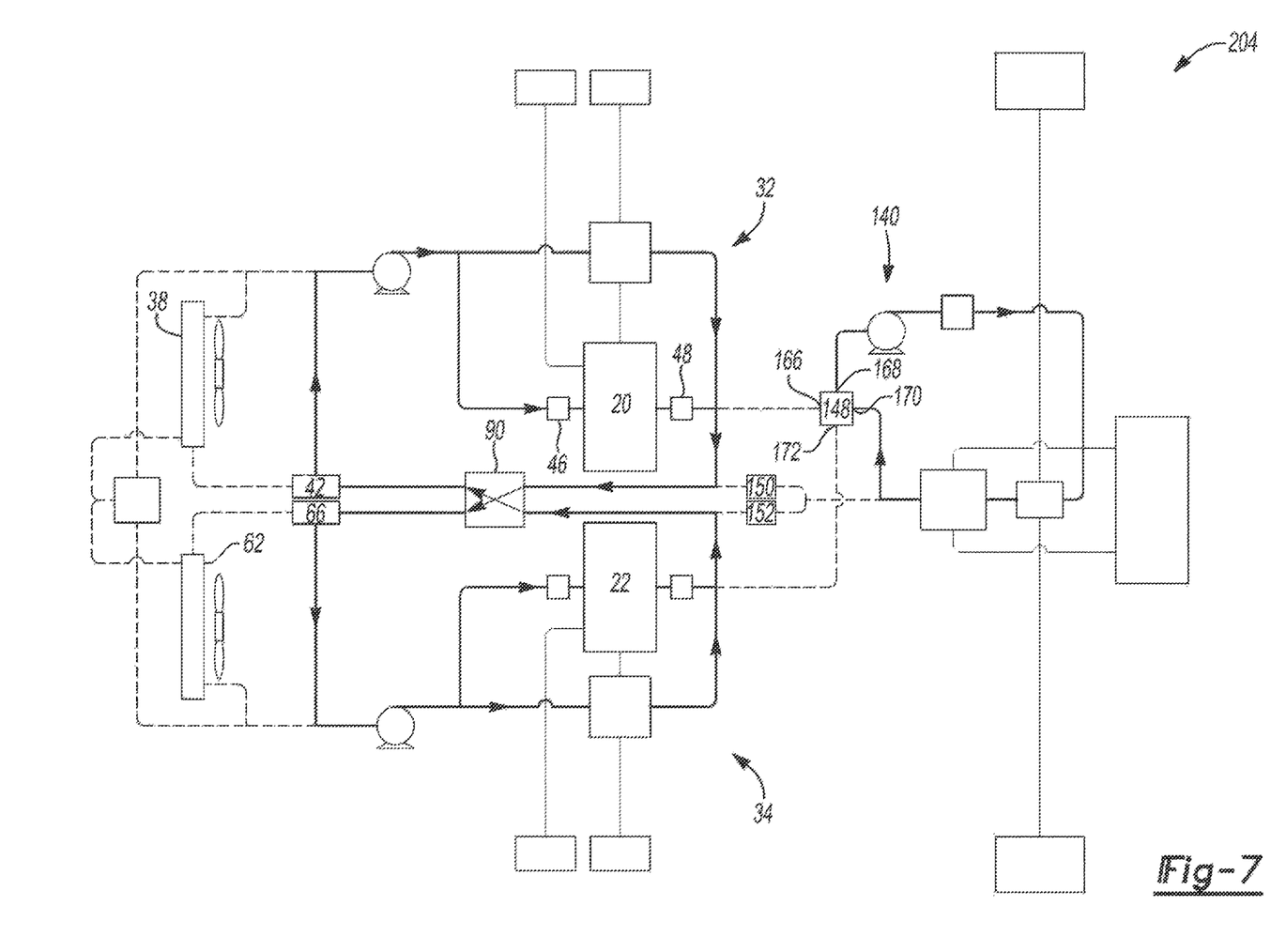
FIG. 7 is a schematic diagram of the thermal management system in a fuel-cell-to-fuel-cell warmup mode.

FIG. 7 illustrates a fuel-cell-to-fuel-cell warmup mode 204 where waste heat from the fuel-cell stack 20 is used to preheat the fuel-cell stack 22 to a startup temperature. In mode 204, the first circuit 32 and the second circuit 34 are connected in fluid communication via the valve arrangement 90 and the third circuit 140 is isolated. The third circuit 140 may be activated or deactivated depending upon the needs of the battery and the cabin. In FIG. 7, the third circuit 140 is activated (pump and heater ON) to heat the battery 14 and the passenger cabin.

The valves 150 and 152 are actuated to the closed position to prevent the flow of fluid from the third circuit 140 to the first and second circuits 32, 34. The four-way valve 148 is actuated so that the ports 166 and 172 are OFF and the ports 170 and 168 are open so that fluid circulates only through the third circuit 140. The pumps 36 and 60 are energized to circulate coolant and the valves 42 and 66 are actuated to bypass the radiators 38 and 62. The valve arrangement 90 is in one of the open (mixing) positions to connect the first circuit 32 and the second circuit 34 in fluid communication. During operation, heated coolant exiting the stack 20 is circulated through the valve arrangement 90 so that at least some of the fluid flows to the second circuit 34 and subsequently through the fuel-cell stack 22 to heat the stack. The valve arrangement 90 is controlled so that the temperature of the coolant in the first circuit 32 is maintained above a desired temperature. In general, the valve arrangement 90 is actuated to gradually increase the mixing of the circuits 32, 34 as the second stack 22 warms. For example, the controller 91 will control the inlet temperature of the running fuel cell (e.g. first stack 20) within a desired range, while monitoring the outlet temperature of the fuel cell 20 such that the temperature difference between the inlet and the outlet of the stack 20 (e.g., sensors 46, 48) is also within a desired range. In the second circuit 34, the controller 91 monitors one or more of the temperature sensors to determine if the stack 22 is ready to start.

In the vehicle 10, the second stack 22 may be used to warm the first stack 20 using a mode similar to the mode 204. This may be used, for example, if the second stack 22 is preconditioned using the heater 144 as described in the above non-illustrated mode.

Figure 8:
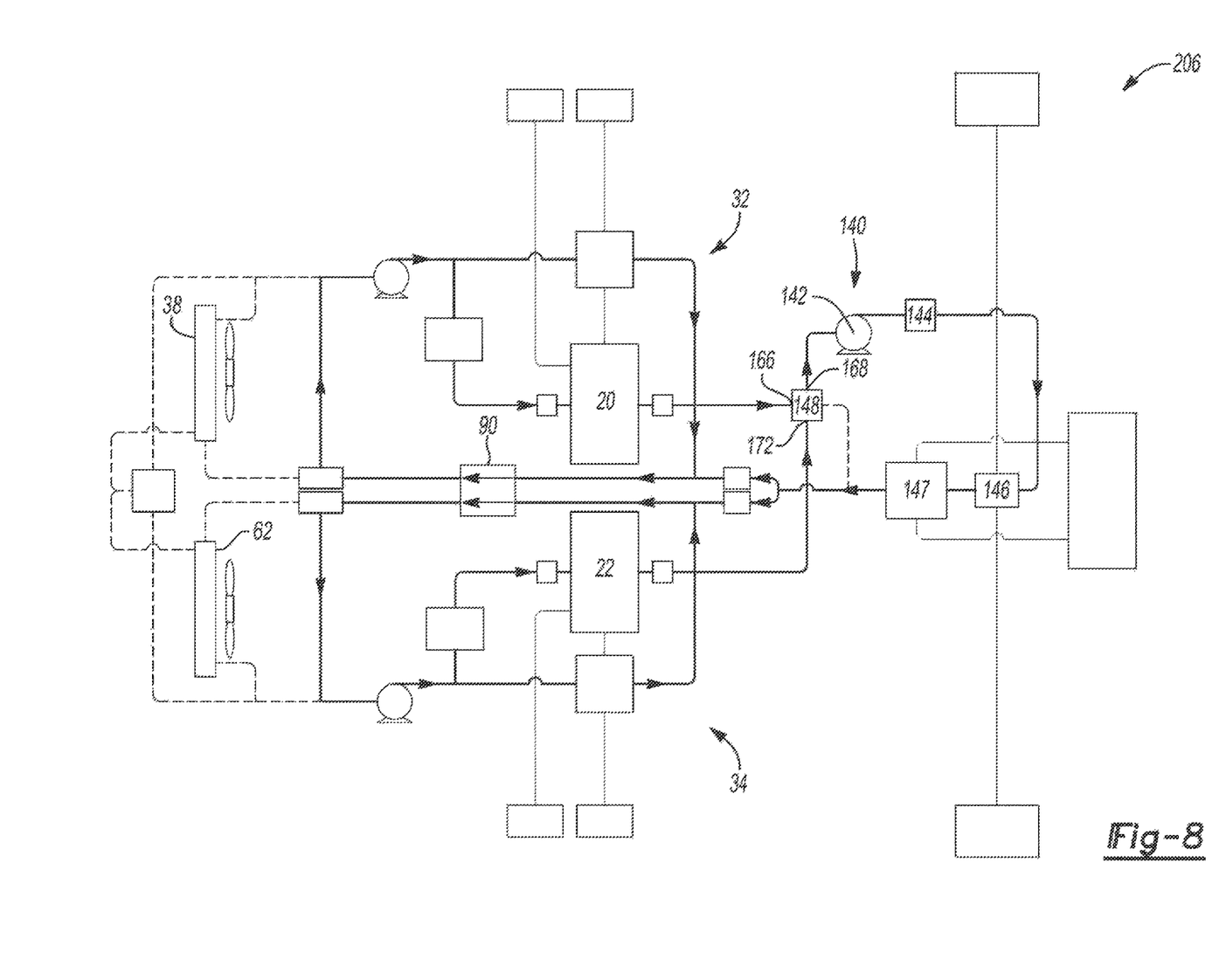
FIG. 8 is a schematic diagram of the thermal management system in a cabin-and-battery heating mode.

Referring to FIG. 8, once both stacks 20, 22 reach an operating temperature range, the vehicle may enter into a cabin-and-battery heating mode 206. In mode 206, the third circuit 140 is in fluid communication with the first and second circuits 32, 34, but the valve arrangement 90 is closed to isolate the first and second circuits 32, 34 from each other. (In other embodiments or conditions, the valve arrangement 90 may be open to connect the first and second circuits 32, 34 in fluid communication.) The heater 144 is OFF and heat from the fuel-cell stacks 20 and 22 are used to heat the battery 14 and the cabin. Heated coolant discharge from the first stack 20 is circulated to the inlet port 166 of the four-way valve 148 and heated coolant discharge from the second stack 22 is circulated to the inlet port 172 of the four-way valve. The four-way valve is actuated to route both inlet ports 166 and 172 to the outlet port 168 connected to the pump 142. The pump 142 circulates the heated coolant through the heat exchanger 146 and the heater core 147 to heat the battery 14 and the cabin. This reduces the temperature of the coolant which is then circulated back to the first and second circuits 32 and 34. In FIG. 8, the radiators 38 and 62 are being bypassed, however, if the heater core 147 and the heat exchanger 146 are insufficient to cool the coolant, one or more of these radiators may be used as needed to maintain their respective fuel-cell stack within the desired temperature range.

In another operating mode similar to mode 204, the third circuit 140 may be deenergized if neither the battery nor the cabin are requesting heat. Here, the valves 150, 152 may be closed and the four-way valve 148 may be actuated to close inlets 166, 172.

Figure 9:
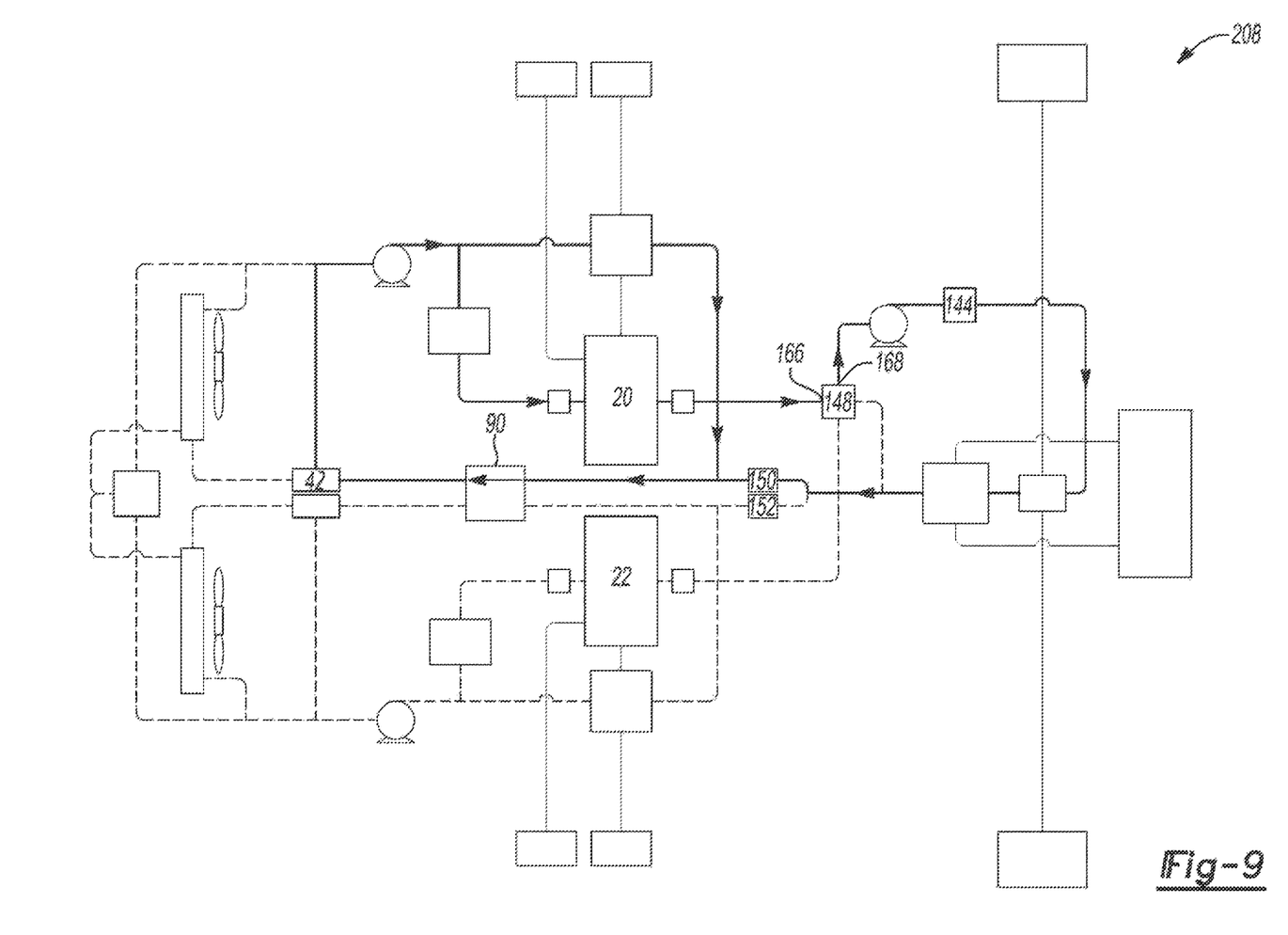
FIG. 9 is a schematic diagram of the thermal management system in a mode where the first stack is ON and the second stack is OFF.

The vehicle 10 may only operate on one of the fuel cells at a time depending upon the operating needs of the vehicle. FIG. 9 illustrates an example where the first stack 20 is ON and the second stack 22 is OFF. In this mode, 208, the valve 152 and the valve arrangement 90 are actuated to the closed positions to prevent the flow of fluid to and from the second circuit 34. In mode 208, the fuel-cell stack 20 is being used to heat the cabin and the battery and the heater 144 is OFF. The valve 150 is open and the four-way valve 148 is actuated so that coolant flows from the port 166 to the port 168 as described above in FIG. 8. The valve 42 is operated to maintain the coolant temperature within a desired range. The vehicle 10 may also be operated with second stack 22 only and have another mode that is the mirror of mode 208.

Figure 10:
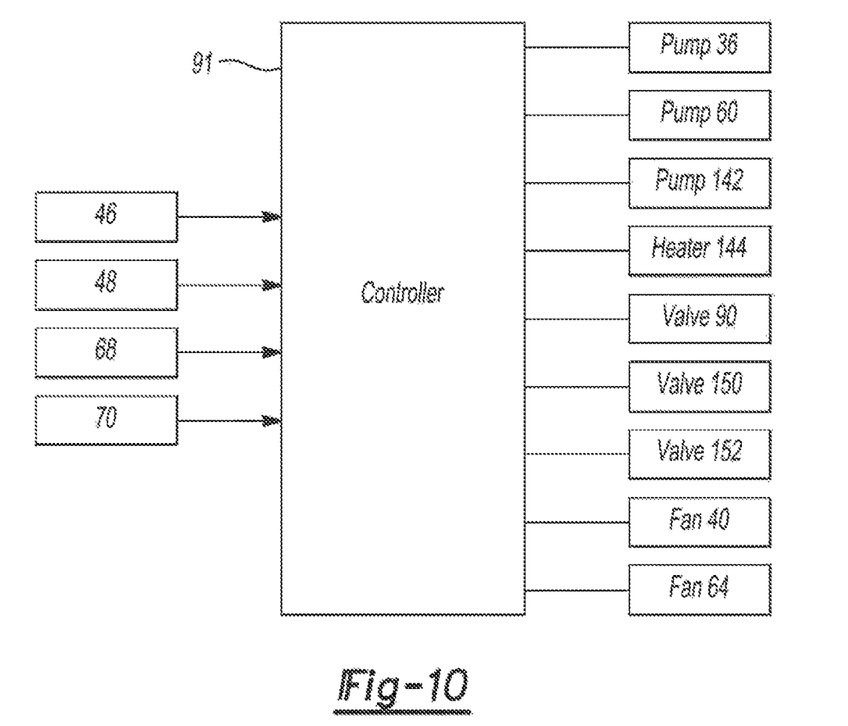
FIG. 10 is a control diagram for the thermal management system.

FIG. 10 is a control diagram for the thermal management system 30 and shows a non-exhaustive list of component in electric communication with the controller 91 that controls operation of at least the system 30. While illustrated as one controller, the controller 91 may be part of a larger control system and may be controlled by various other controllers throughout the vehicle 10, such as a vehicle system controller (VSC). The VSC may control the various vehicle components such the thermal management system 30, the fuel-cell stacks, and many others. It should therefore be understood that the controller 91 and one or more other controllers of the VSC can collectively be referred to as a "controller" that controls various actuators in response to signals from various sensors to control functions of the thermal management system 30 and the fuel-cell stacks. Controller 91 may include a microprocessor or central processing unit (CPU) in communication with various types of computer-readable storage devices or media. Computer-readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle.

The controller communicates with various vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. Although not explicitly illustrated, those of ordinary skill in the art will recognize various functions or components that may be controlled by controller 91 within each of the subsystems identified above.

The controller 91 is in electric communication with the temperature sensors 46, 48, 68, and 70 as well as any additional temperature sensors or pressure sensors (not illustrated) if provided. Each temperature sensor 46 is configured to output a signal to the controller 91 indicative of a sensed temperature of the coolant or other measured component. The controller 91 includes logic for interpreting the signals and commanding the various actuators accordingly. The controller 91 may output signals to the pumps 36, 60, 142 including an activation state (ON or OFF) and a speed setting. The valve arrangement 90 and the valves 150, 152 are also in electric communication with the controller 91. The controller 91 is configured to command actuation of these valves. One or more the valves may include an associated actuator that moves the valve between various positions to control flow of coolant through the valve. The controller 91 may also control operation of the radiator fans 40 and 64, and any other electronic valves.

Control logic or functions performed by controller 91 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 91. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Figure 11:
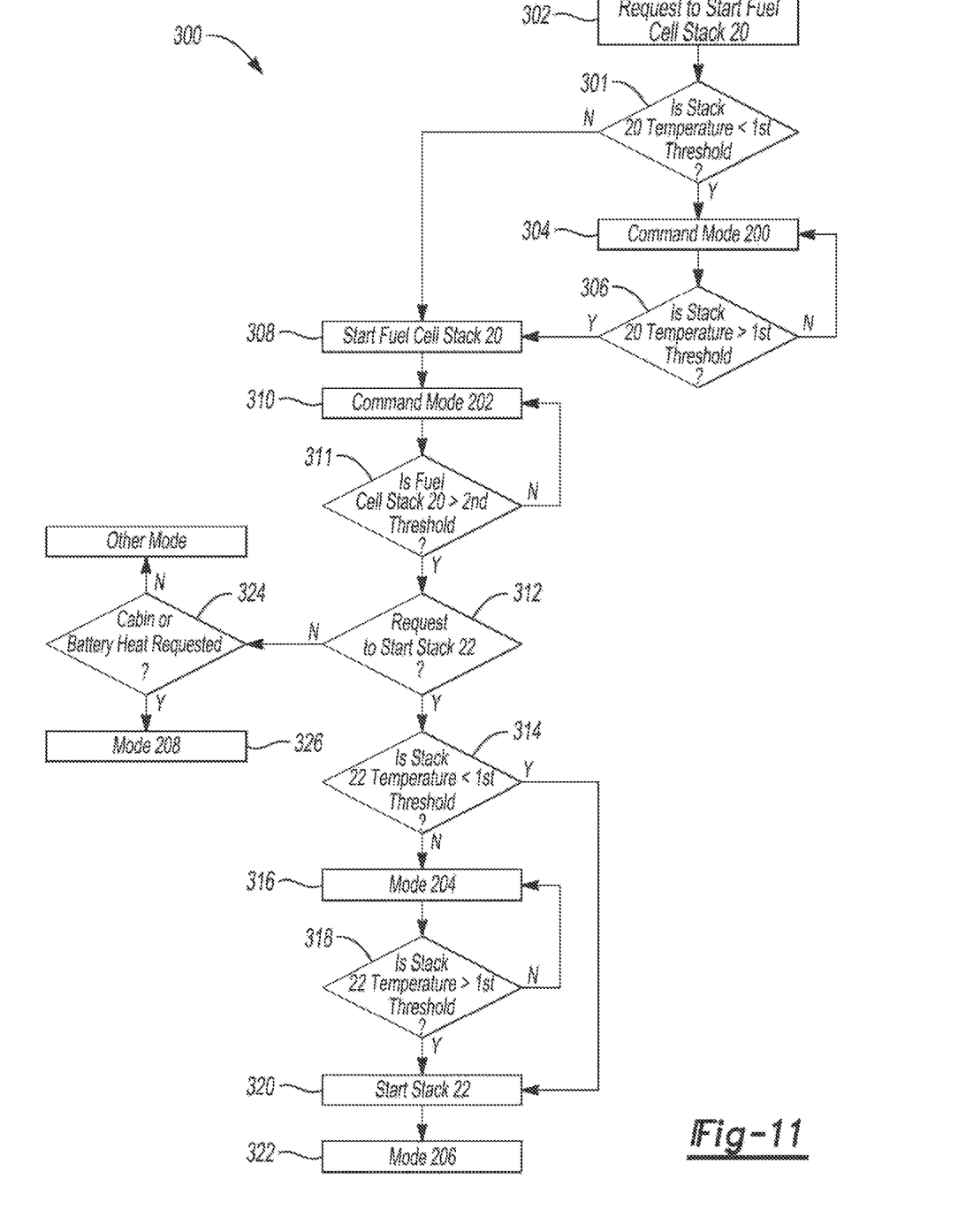
FIG. 11 is a flowchart of an algorithm for controlling the thermal management system during a cold start.

FIG. 11 is a flowchart 300 of an algorithm for controlling the thermal management system 30 during cold starting of the fuel-cell stacks. The flowchart 300 illustrates an embodiment in which the first fuel-cell stack 20 is started first, but this may be switched in other embodiments. The controls began at operation 302 where the driver or vehicle has requested starting of the fuel-cell stack 20. At operation 301, the controller determines if the temperature of the stack 20 is less than a first threshold. The controller may determine the temperature based on signals from one or more of the temperature sensors of the thermal management system 30. The first threshold may be called the cold-start threshold and may have a value of −25 degrees C. for example. If yes at operation 301, the fuel-cell stack 20 is too cold to be reliably started and control passes to operation 304 to precondition the stack 20 until the temperature exceeds the first threshold. Operation 304 may include commanding the thermal management system to mode 200 shown in FIG. 5. The controller may command mode 200 by commanding the valve arrangement 90 to the closed (isolation) position, commanding the heater ON, commanding the valve 150 to open, commanding the valve 152 closed, commanding the four-way valve 148 to only route coolant from the inlet 166 to the outlet 168, and energizing the pumps 36 and 142.

The thermal management system 30 remains in the mode 200 until the fuel-cell stack 20 exceeds the cold-start threshold. Once the stack 20 exceeds the cold-start threshold (determined at operation 306), control passes to operation 308 and the fuel-cell stack 20 is started. Control passes to operation 310 after the fuel-cell stack 20 is started. At operation 310, the thermal management system 30 is switched to mode 202. The controller may switch from mode 200 to mode 202 by closing the valve 150 and actuating the four-way valve 148. The thermal management system 30 remains in mode 202 until the fuel-cell stack 20 exceeds a second threshold. The second threshold may be called a warm-up threshold and may have a value of 50 degrees C. for example.

If the fuel-cell stack 20 exceeds the second threshold at operation 311, control passes to operation 312 the controller determines if there is a request to start the second fuel-cell stack 22. If yes, control passes to operation 314 and the controller determines if the second stack 22 is less than the cold-start threshold. If it is, control passes to operation 316 and the controller commands the thermal management system 30 to mode 204. The controller may switch from mode 202 to mode 204 by opening the valve arrangement 90 to an initial mixing position that routes a small amount of coolant through the paths 112 and 116 to begin mixing the first and second circuits 32, 34 and warming the second stack 22 with waste heat of the first stack 20. The controller may be programmed to gradually open the valve arrangement 90 to heat the second stack 22 while preventing the coolant temperature of the first circuit 32 from falling below a desired operating range. The pumps 36, 60 may be commanded to run at the same speed.

At operation 318, the controller determines if the temperature of the fuel-cell stack 22 exceeds the first threshold. If no, the thermal management system 30 remains in mode 204 until the second fuel-cell stack 22 is heated to the first threshold. The fuel-cell stack 22 is started at operation 320 once the first threshold temperature is achieved. The controller commands the thermal management system 30 to the mode 206 at operation 322. The controller may switch the thermal management system 30 from mode 204 to mode 206 by closing the valve arrangement 90. In mode 206, the first circuit 32 and/or the second circuit 34 may be used to heat the cabin, the traction battery 14, or both. In the illustrated mode 206, both circuits 32, 34 are used, in which case, the valves 150, 152 are open and the four-way valve 148 is actuated to route coolant from the inlet 166 to the outlet 168 to place the first and third circuits 32, 140 in fluid communication and to route coolant from the inlet 172 to the outlet 168 to place the second and third circuits 34, 140 in fluid communication. Using waste heat of the fuel-cell stacks 20, 22 to heat the battery 14 and the cabin allows the heater 144 to be deenergized allowing for more of the electricity generated by the fuel cells for use for propulsion.

If no at operation 312, control passes to operation 324 and the controller determines if the cabin or battery are requesting heat. If no, control passes to other control logic which will not be discussed here. If yes, control passes operation 326 and the controller commands the thermal management system 30 to the mode 208. In mode 208, the second circuit 34 is deenergized since the fuel-cell stack 22 is OFF and the first and third circuits 32, 140 are connected in fluid communication. Waste heat from the fuel-cell stack 20 is used to heat the passenger cabin via the heater core 147 and to heat the battery 14 via the heat exchanger 146. The heater 144 may be OFF if the waste heat of the fuel-cell stack 20 is sufficient to provide the requested heating of the battery and the cabin. Otherwise the heater 144 may be activated to provide additional heat.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated.

While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   first and second fuel-cell stacks;
   a first coolant circuit including conduit arranged to circulate coolant through the first fuel-cell stack;
   a second coolant circuit including conduit arranged to circulate coolant through the second fuel-cell stack;
   a heater in fluid communication with at least the first coolant circuit;
   a valve arrangement configured to proportion a flow of coolant between the first and second coolant circuits, the valve arrangement including an isolation position in which the first and second circuits are not in fluid communication and at least one mixing position in which the first and second circuits are in fluid communication; and
   a controller programmed to:
   in response to coolant of the first circuit being less than a first threshold, command the isolation valve assembly to the isolation position and command the heater ON, and
   in response to coolant of the first circuit exceeding a second threshold, command the isolation valve assembly to the at least one mixing position and command the heater OFF.

2. The vehicle of claim 1, wherein the controller is further programmed to start the first fuel cell in response to the coolant of the first circuit exceeding the first threshold.

3. The vehicle of claim 1, wherein the controller is further programmed to, in response to coolant of the second circuit exceeding the second threshold, command starting of the second fuel cell and command the isolation valve assembly to the isolation position.

4. The vehicle of claim 1 further comprising:
   a third coolant circuit including conduct arranged to circulate the coolant through the heater; and
   a second valve arrangement configured to selectively connect the third circuit to the first circuit and configured to selectively connect the third circuit to the second circuit, wherein the controller is further programmed to actuate the second valve arrangement to connect the first and third circuits in response to the coolant of the first circuit being less than the first threshold.

5. The vehicle of claim 4, wherein the controller is further programmed to actuate the second valve arrangement to isolate the first and third circuits in response to the coolant of the first circuit exceeding the first threshold.

6. The vehicle of claim 2, wherein the controller is further programmed to, in response to coolant of the second circuit exceeding the second threshold, command starting of the second fuel cell and command the isolation valve assembly to the isolation position.

7. The vehicle of claim 6 further comprising:
   a third coolant circuit including conduct arranged to circulate the coolant through the heater; and
   a second valve arrangement configured to selectively connect the third circuit to the first circuit and configured to selectively connect the third circuit to the second circuit, wherein the controller is further programmed to actuate the second valve arrangement to connect the first and third circuits in response to the coolant of the first circuit being less than the first threshold.

8. The vehicle of claim 7, wherein the controller is further programmed to actuate the second valve arrangement to isolate the first and third circuits in response to the coolant of the first circuit exceeding the first threshold.

* * * * *